(12) United States Patent
Gindin et al.

(10) Patent No.: US 6,455,632 B1
(45) Date of Patent: Sep. 24, 2002

(54) AQUEOUS POLYURETHANE DISPERSIONS CONTAINING SECONDARY AMIDE GROUPS AND THEIR USE IN ONE-COMPONENT THERMOSET COMPOSITIONS

(75) Inventors: Lyubov K. Gindin, Pittsburgh; Karen M. Henderson, Coraopolis, both of PA (US); Sze-Ming Lee, Houston, TX (US); Brian Long, Clarington, OH (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/730,079

(22) Filed: Dec. 5, 2000

(51) Int. Cl.$^7$ .............................. C08J 3/00; C08K 3/20; C08L 75/00
(52) U.S. Cl. .................... 524/591; 428/423.1; 524/839; 524/840
(58) Field of Search ................................ 524/591, 839, 524/840; 428/423.1

(56) References Cited

U.S. PATENT DOCUMENTS 3,935,146 A * 1/1976 Noll et al.
5,780,559 A    7/1998 Humbert et al. ............ 525/452

* cited by examiner

*Primary Examiner*—Patrick D. Niland
(74) *Attorney, Agent, or Firm*—Joseph C. Gil; Thomas W. Roy

(57) ABSTRACT

The present invention relates to aqueous polyurethane dispersions containing secondary amide groups in the backbone of the polyurethane, wherein the secondary amide groups (calculated as NH—CO—, MW 43) are present in an amount of 1 to 14% by weight, based on the weight of the polyurethanes, and correspond to the formula $$-X_1-R_1-NH-C(O)-R_2-X_2- \qquad (I)$$

wherein $X_1$, and $X_2$ are the same or different and represent the groups obtained by removing a hydrogen atom from a hydroxy group or a primary or secondary amino group and $R_1$ and $R_2$ are the same or different and represent linear or branched hydrocarbon groups that are optionally substituted by groups that do not contain isocyanate-reactive hydrogen atoms.

The present invention also relates to aqueous, one-component, thermoset compositions containing the polyurethanes with amide groups in the backbone and a cross-linking component that is reactive with amide groups. Finally, the present invention relates to coatings, sealants and adhesives prepared from these aqueous, one-component, thermoset compositions.

16 Claims, No Drawings

AQUEOUS POLYURETHANE DISPERSIONS CONTAINING SECONDARY AMIDE GROUPS AND THEIR USE IN ONE-COMPONENT THERMOSET COMPOSITIONS

BACKGROUND OF THE INVENTION

1. Field of the Invention

The present invention relates to aqueous polyurethane dispersions containing amide groups in the backbone of the polyurethane; to aqueous, one-component, thermoset compositions containing these dispersions and a cross-linking component; and to coatings, sealants and adhesives prepared from these compositions.

2. Description of the Prior Art

One-component polyurethane coating compositions containing polyisocyanates blocked with reversible, monofunctional blocking agents for isocyanate groups and polyols are an important class of materials for applications such as automotive OEM coatings. While these one-component compositions overcome the difficulties of two-component coating compositions with regard to accurate metering of the components, the one-component coating compositions also have disadvantages, which are primarily caused by the presence of organic solvents and the volatilization of the blocking agent.

The release of the blocking agent can cause blistering and yellowing in thick films and oven fouling. In addition, the blocking agents are considered to be volatile organic compounds (VOC's) in the same manner as organic solvents. Therefore, it is difficult for these coating compositions to satisfy environmental regulations due to the presence of organic solvents and blocking agents.

It is an object of the present invention to overcome the known disadvantages of one-component coating compositions caused by the release of blocking agents during cure and the presence of organic solvents without affecting the advantages of these coating compositions when compared to two-component coating compositions.

These objects can be achieved with the aqueous, one-component compositions according to the present invention, which are based on aqueous polyurethane dispersions containing secondary amide groups in the backbone and crosslinking agents that are reactive with amide groups.

U.S. Pat. No. 5,780,559 discloses polyurethanes containing amide groups; however, the amide groups are present in terminal positions as opposed to being present in the backbone. As shown in the comparison examples hereinafter, polyurethanes containing amide groups in terminal positions are not stable when dispersed in water.

SUMMARY OF THE INVENTION

The present invention relates to aqueous polyurethane dispersions containing secondary amide groups in the backbone of the polyurethane, wherein the secondary amide groups (calculated as NH—CO—, MW 43) are present in an amount of 1 to 14% by weight, based on the weight of the polyurethanes, and correspond to the formula $$—X_1—R_1—NH—C(O)—R_2—X_2—$$ (I)

wherein $X_1$ and $X_2$ are the same or different and represent the groups obtained by removing a hydrogen atom from a hydroxy group or a primary or secondary amino group and $R_1$ and $R_2$ are the same or different and represent linear or branched hydrocarbon groups that are optionally substituted by groups that do not contain isocyanate-reactive hydrogen atoms.

The present invention also relates to aqueous, one-component, thermoset compositions containing the polyurethanes with amide groups in the backbone and a cross-linking component that is reactive with amide groups. Finally, the present invention relates to coatings, sealants and adhesives prepared from these aqueous, one-component, thermoset compositions.

DETAILED DESCRIPTION OF THE INVENTION

In accordance with the present invention the term "polyurethane" means polymers containing urethane and/or urea groups.

The aqueous polyurethane dispersions according to the invention may be prepared by either a one-step or a two-step process, preferably by a two-step process. In the one-step process all of the components are mixed together and reacted in one step. In the two-step process an NCO prepolymer is formed in the first step and is subsequently reacted with a compound corresponding to formula II and optionally a low molecular weight, isocyanate-reactive chain extender in the second step to form the polyurethane either before, during or after being mixed with an aqueous medium. The NCO prepolymer is prepared by reacting an organic polyisocyanate with a high molecular weight polyol, an isocyanate-reactive compound containing hydrophilic groups and optionally a low molecular weight polyol.

The polyurethanes may be dispersed in water by either the inverse process or the direct process. In the direct process water is added to the polymer to initially form a water-in-oil emulsion, which after passing through a viscosity maximum, is converted into an oil-in-water emulsion. In the inverse process the polymer is added to water, which avoids the need to pass through the viscosity maximum.

Even though more energy is required for preparing a dispersion by the direct process, it may be necessary to use this process if the viscosity of the polymer is too high to add it to water. A high viscosity polymer is often obtained when a fully reacted polyurethane is prepared in the organic phase, especially when large amounts of solvent are not used to reduce the viscosity.

To obtain a suitable viscosity for using the inverse process without the use of large amounts of solvent, the NCO prepolymer can be dispersed in water and then reacted with the compounds corresponding to formula II and optionally with an amine chain extender.

In addition to the one-step process in which all of the components are reacted to form the polyurethane in one step and the preferred two-step process previously set forth, it is also possible to incorporate the compounds corresponding to formula II into the NCO prepolymers, which are then chain extended with polyamine chain extenders or crosslinking agents in known manner.

Any of the known starting materials for preparing polyurethane dispersions may be used for preparing the dispersions according to the invention, provided that sufficient isocyanate groups are reacted with the compounds corresponding to formula II to obtain the required secondary amide group content.

The groups set forth in formula I can be prepared by reacting isocyanate groups with compounds corresponding to the formula

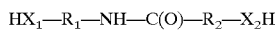  (II)

wherein

X₁ and X₂ are the same or different and represent the groups obtained by removing a hydrogen atom from a hydroxy group or a primary or secondary amino group, preferably a hydroxy group, and R₁ and R₂ are the same or different and represent linear or branched hydrocarbon groups that are optionally substituted by groups that do not contain isocyanate-reactive hydrogen atoms, preferably linear or branched aliphatic hydrocarbon groups having 1 to 10, more preferably 1 to 6 carbon atoms.

The compounds of formula II may be prepared by any suitable method. For example, a compound containing a primary amino group and a hydroxy group or a primary or secondary amino groups can be reacted with a compound containing an acid group and either a hydroxy group or a primary or secondary amino group to form a compound corresponding to formula II.

When the acid groups and primary amino groups are reacted directly a salt is initially formed, which can subsequently be converted to the amide by dehydration or heating. To form amide groups directly, it is preferred to react the primary amino groups with carboxylic acid esters or acid chlorides.

Suitable compounds containing a primary amino group and at least one hydroxy, primary amino or secondary amino group include the polyamines and amino alcohols known from polyurethane chemistry. Examples include the diamines set forth hereinafter for chain extending the aqueous polyurethane dispersions. Preferred compounds are the amino alcohols such ethanol amine and the isomeric propanol and butanol amines. Isopropanol amine is especially preferred.

Suitable compounds containing an acid group and a hydroxy group or a primary or secondary amino group include hydroxy aliphatic acids and amino aliphatic acids, such as hydroxy ethanoic acid, amino ethanoic acid, and the isomeric hydroxy and amino propanoic and butanoic acids. Also suitable are cyclic compounds that can be hydrolyzed to form compounds acid groups and either hydroxy or amino groups. Examples include lactones, such as ε-caprolactone, and lactams, such as ε-caprolactam. ε-caprolactone is especially preferred.

The compounds corresponding to formula II are present in an amount sufficient to incorporate a minimum amount of 1%, preferably 2% and more preferably 3% by weight, and a maximum amount of 14%, preferably 12% and more preferably 10% by weight, of the secondary amide groups (calculated as NH—CO—, MW 43), wherein the percentages are based on the weight of the polyurethanes.

Suitable polyisocyanates which may be used to prepare the polyurethanes are known and include organic diisocyanates represented by the formula, R(NCO)₂, in which R represents an organic group obtained by removing the isocyanate groups from an organic diisocyanate having a molecular weight of from about 112 to 1,000, preferably from about 140 to 400. Diisocyanates preferred for the process according to the invention are those represented by the above formula in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanatomethyl)-cyclohexane, bis-(4-isocyanatocyclohexyl)-methane, 2,4'-diisocyanato-dicyclohexyl methane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydro-toluylene diisocyanate, 1,3- and/or 1,4-phenylene diisocyanate, 2,4-and/or 2,6-toluylene diisocyanate, 2,4- and/or 4,4'-diphenylmethane diisocyanate and 1,5-diisocyanato naphthalene and mixtures thereof.

Polyisocyanates containing 3 or more isocyanate groups such as 4-isocyanatomethyl-1,8-octamethylene diisocyanate and aromatic polyisocyanates such as 4,4',4''-triphenylmethane triisocyanate and polyphenyl polymethylene polyisocyanates obtained by phosgenating aniline/formaldehyde condensates may also be used. Also suitable are polyisocyanate adducts prepared from the preceding monomeric diisocyanates and containing isocyanurate, uretdione, biuret, urethane, allophanate, iminooxadiazine dione, carbodiimide and/or oxadiazine-trione groups.

Preferred diisocyanates bis-(4-isocyanatocyclohexyl)-methane, 1,6-hexamethylene diisocyanate and isophorone diisocyanate, especially bis-(4-isocyanatocyclohexyl)-methane and isophorone diisocyanate.

Organic compounds containing at least two isocyanate-reactive groups, which may be reacted with the previously described organic diisocyanates to prepare the NCO prepolymers, can be divided into two groups, i.e., high molecular weight compounds having molecular weights from 400 to about 6,000, preferably from 800 to about 3,000, and low molecular weight compounds (chain extenders) having molecular weights below 400. The molecular weights are number average molecular weights (M$_n$) and are determined by end group analysis (OH number). Examples of the high molecular weight compounds are polyester polyols, polyether polyols, polyhydroxy polycarbonates, polyhydroxy polyacetals, polyhydroxy polyacrylates, and polyhydroxy polythioethers. The polyester polyols, polyether polyols and polyhydroxy polycarbonates are preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g. ethylene glycol; propylene glycol-(1,2) and -(1,3); butylene glycol-(1,4) and -(1,3); hexanediol-(1,6);

octanediol-(1,8); neopentyl glycol; cyclohexanedimethanol (1,4-bis-hydroxymethyl-cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethlyolpropane. The polyesters may also contain a portion of carboxyl end groups. Polyesters of lactones, e.g., ϵ-caprolactone or hydroxy-carboxylic acids, e.g. ω-hydroxycaproic acid, may also be used.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diaryl-carbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

Polyethers which have been obtained by the reaction of starting compounds containing amine compounds can also be used, but are less preferred for use in the present invention. Examples of these polyethers as well as suitable polyhydroxy polyacetals, polyhydroxy polyacrylates and polyhydroxy polythioethers are disclosed in U.S. Pat. No. 4,701,480, herein incorporated by reference.

The high molecular weight polyols used in amount of at least 5%, preferably at least 10% by weight, based on the weight of the polyurethane. The maximum amount of these polyols is 85%, preferably 75% by weight, based on the weight of the polyurethane.

The low molecular weight isocyanate-reactive component having an average molecular weight of up to 400 is selected from the polyhydric alcohols, preferably dihydric alcohols, which have previously been described for the preparation of the polyester polyols and polyether polyols, and the low molecular polyamines, preferably diamines, which are described hereinafter. Also suitable are aldimines as disclosed in U.S. Pat. No. 5,569,706, herein incorporated by reference.

In addition to the above-mentioned components which are preferably difunctional in the isocyanate polyaddition reaction, mono-functional and even small portions of tri-functional and higher functional components generally known in polyurethane chemistry, such as trimethylolpropane, may be used in special cases in which slight branching of the NCO prepolymer or polyurethane is desired. However, the NCO prepolymers should preferably be substantially linear and this may be achieved by maintaining the average functionality of the prepolymer starting components below about 2.1.

In order to enable the polyurethane to be stably dispersed in an aqueous medium, ionic or potential ionic groups and/or lateral or terminal, hydrophilic ethylene oxide units are chemically incorporated into the polyurethane. The ionic or potential ionic groups may be either anionic or cationic, preferably anionic. Examples of anionic groups include carboxylate and sulfonate groups, while examples of cationic groups include ammonium and sulfonium groups. The ionic groups are incorporated in an amount sufficient to provide an ionic group content of 0 to 200 milliequivalents per 100 g of polyurethane. When the ionic or potential ionic groups are incorporated, they are preferably incorporated in an amount sufficient to provide an ionic group content of at least 10, preferably at least 20 milliequivalents per 100 g of polyurethane. The upper limit for the content of ionic groups is preferably 180, more preferably 100 milliequivalents per 100 g of polyurethane.

The content of hydrophilic ethylene oxide units may be up to about 10%, preferably up to about 8%, more preferably about 1 to 6% and most preferably about 2 to 6%, by weight, based on the weight of the polyurethane. In addition, up to about 75% of the allowable, chemically incorporated, hydrophilic ethylene oxide units may be replaced by the known nonionic, external emulsifiers such as those of the alkaryl type such as polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type.

The ionic or potential ionic groups may be chemically incorporated into the NCO prepolymer or may be chemically incorporated through the chain extender which is used to form the polyurethane from the prepolymer. Suitable compounds for incorporating these groups include i) monoisocyanates or diisocyanates which contain ionic or potential ionic groups and ii) compounds which are monofunctional or difunctional in the isocyanate-polyaddition reaction and contain ionic or potential ionic groups.

The ionic groups are formed by neutralizing the corresponding potential ionic groups either prior to, during or after formation of the polyurethane. When the potential ionic groups are neutralized prior to their incorporation into the polyurethane, the ionic groups are incorporated directly. When neutralization is performed subsequent to forming the polyurethane, potential ionic groups are incorporated.

Suitable compounds for incorporating the carboxylate, sulfonate and quaternary nitrogen groups are described in U.S. Pat. Nos. 3,479,310, 4,108,814 and 4,303,774, the disclosures of which are herein incorporated by reference. Suitable compounds for incorporating tertiary sulfonium groups are described in U.S. Pat. No. 3,419,533, also incorporated by reference. The preferred sulfonate groups for incorporation into the NCO prepolymer are the diol sulfonic acids or the diol sulfonates disclosed in U.S. Pat. No. 4,108,814.

The neutralizing agents for converting the potential ionic groups to ionic groups are described in the preceding U.S. patents and are also discussed hereinafter. Within the context of this invention, the term "neutralizing agents" is meant to embrace all types of agents which are useful for converting potential ionic groups to ionic groups.

The preferred carboxylate groups for incorporation into polyurethane in either the one-step or two-step process are derived from hydroxy-carboxylic acids of the general formula:

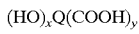

wherein
Q represents a straight or branched, hydrocarbon radical containing 1 to 12 carbon atoms, and
x and y represent values from 1 to 3.

Examples of these hydroxy-carboxylic acids include citric acid and tartaric acid.

The preferred acids are those of the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula

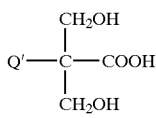

wherein Q' is hydrogen or an alkyl group containing 1 to 8 carbon atoms. The most preferred compound is α,α-dimethylol propionic acid, i.e., when Q' is methyl in the above formula.

When incorporating the anionic or potential anionic groups through the chain extender used to convert the NCO prepolymer to the polyurethane in the second step of the two-step process, it is preferred to use amino functional compounds containing anionic or potential anionic groups such as the diamino carboxylic acids or carboxylates disclosed in U.S. Pat. No. 3,539,483 or salts of 2,6-diaminohexanoic acid. When sulfonate groups are desired they may be incorporated through the chain extenders using salts of isothionic acid or preferably diamino sulfonates of the formula

wherein
A and B represent aliphatic hydrocarbon radicals containing 2 to 6 carbon atoms, preferably ethylene groups.

Whether the ionic groups are incorporated into the polyurethane via the prepolymer or the chain extender is not critical. Therefore, the ionic groups may exclusively be incorporated via the prepolymer or via the chain extender or a portion of the ionic groups may be introduced according to each alternative. However, it is preferred to introduce the ionic groups via the prepolymer since this allows a wider range of process variations in preparing the polyurethane dispersion.

Suitable compounds for incorporating the lateral or terminal, hydrophilic ethylene oxide units may be either monofunctional or difunctional in the context of the isocyanate-polyaddition reaction and include i) diisocyanates which contain lateral, hydrophilic ethylene oxide units,
ii) compounds which are difunctional in the isocyanate-polyaddition reaction and contain lateral, hydrophilic ethylene oxide units,
iii) monoisocyanates which contain terminal, hydrophilic ethylene oxide units,
iv) compounds which are monofunctional in the isocyanate-polyaddition reaction and contain terminal, hydrophilic ethylene oxide units, and
v) mixtures thereof.

Examples of these compounds are disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example propylene oxide.

In the two-step process the NCO prepolymers are prepared by reacting the polyisocyanate component with the high molecular weight organic component containing at least two isocyanate-reactive groups, optionally the low molecular weight organic component containing at least two isocyanate-reactive groups and optionally the compounds containing at least one ionic group, at least one potential ionic group or hydrophilic ethylene oxide units. The ratio of isocyanate groups to isocyanate-reactive groups is maintained between about 1.1 to 5, preferably about 1.2 to 3 and most preferably about 1.3 to 2.0 on an equivalent basis. The above components may be reacted simultaneously or sequentially to produce the NCO prepolymer.

The reaction temperature during prepolymer production is normally maintained below about 150° C., preferably between about 50° and 130° C. The reaction is continued until the content of unreacted isocyanate groups decreases to the theoretical amount or slightly below. The finished prepolymer should have a free isocyanate content of about 1 to 20%, preferably about 1 to 10% by weight, based on the weight of prepolymer solids.

The prepolymers may be prepared in the presence of solvent provided that the solvent is substantially nonreactive in the context of the isocyanate-polyaddition reaction. Examples of suitable solvents include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons and mixtures thereof.

Suitable neutralizing or quaternizing agents for converting the potential anionic groups to anionic groups either before, during or after their incorporation into the polyurethanes, are tertiary amines, alkali metal cations or ammonia. Examples of these neutralizing agents are disclosed in U.S. Pat. Nos. 4,501,852 and 4,701,480, which are incorporated by reference. Preferred neutralizing agents are the trialkyl-substituted tertiary amines and include triethyl amine, N,N-dimethyl-ethanol amine, triethanol amine and N-methyl-diethanol amine. Suitable neutralizing agents for converting potential cationic groups to cationic groups are disclosed in U.S. Pat. Nos. 3,479,310 and 3,419,533, which are incorporated by reference.

A sufficient amount of the potential ionic groups must be neutralized so that when combined with the hydrophilic ethylene oxide units and optional external emulsifiers, the polyurethane final product will be a stable dispersion. Generally, at least about 75%, preferably at least about 90%, of the potential ionic groups are neutralized to the corresponding ionic groups.

The conversion of the potential ionic groups to ionic groups is conducted in known manner, e.g., as described in the preceding patents setting forth suitable neutralizing agents.

The NCO prepolymers may be converted into aqueous polyurethane dispersions in accordance with the methods known in polyurethane chemistry and described, e.g., in "Waterborne Polyurethanes," Rosthauser et al, Advances in Urethane Science and Technology, Vol. 10, pg. 121–162 (1987).

According to one process for preparing the polyurethane dispersions, the NCO prepolymer is prepared, chain extended and/or chain terminated to form a polyurethane and subsequently dispersed in water. This process is disclosed in U.S. Pat. No. 3,479,310, herein incorporated by reference.

When amines are reacted with the NCO prepolymer either as chain terminators or chain extenders, a preferred method of reacting the NCO prepolymers with amino group-containing compounds is by dispersing the prepolymer in water and then reacting the prepolymer with the amino group-containing compounds, which may be mixed with water either before, during or after dispersing the NCO prepolymer. The amino group-containing compounds are preferably a mixture containing a) 5 to 100 mole percent, based on the moles of amino group-containing compounds, of one or more of the compounds of formula II and b) 0 to 95 mole percent, based on the moles of amino group-containing compounds, of amino group-containing compounds other than a).

Branching of the polyurethane may be obtained by using compounds having an amine functionality of greater than 2 as component b).

In a preferred embodiment of the two-step process for preparing the aqueous polyurethane dispersions of the present invention, the NCO prepolymers are reacted with components a) and b). While component b) may be selected from compounds containing one amino group, preferably component b) has an average amine functionality, i.e., the number of amine nitrogens per molecule, of about 2 to 6, more preferably about 2 to 4 and most preferably about 2 to 3. The desired functionalities can be obtained by using mixtures of polyamines.

Suitable amines are essentially hydrocarbon polyamines containing 2 to 6 amine groups which have isocyanate-reactive hydrogens according to the Zerewitinoff test, e.g., primary or secondary amine groups. The polyamines are generally aromatic, aliphatic or alicyclic amines and contain 1 to 30 carbon atoms, preferably 2 to 15 carbon atoms, and more preferably 2 to 10 carbon atoms. These polyamines may contain additional substituents provided that they are not as reactive with isocyanate groups as the primary or secondary amines.

Examples of polyamines for use as component b) include those disclosed in U.S. Pat. No. 4,408,008, herein incorporated by reference. Preferred polyamines include ethylene diamine, 1,6-hexane diamine, 1,2- and 1,3-propane diamine, the isomeric butane diamines, 1-amino-3-aminomethyl-3,5,5-trimethyl cyclohexane, bis-(4-aminocyclohexyl)-methane, bis-(4-amino-3-methylcyclohexyl)-methane, xylylene diamine, α,α,α',α'-tetramethyl-1,3- and/or -1,4-xylylene diamine, 1-amino-1-methyl-4(3)-aminomethyl cyclohexane, 2,4- and/or 2,6-hexahydrotoluylene diamine, hydrazine, diethylene triamine, triethylene tetramine, tetraethylene pentamine, pentaethylene hexamine.

Especially preferred are 1-amino-3-aminomethyl-3,5,5-trimethylcyclohexane (isophorone diamine or IPDA), bis-(4-amino-cyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentaethylene hexamine.

The amount of amino group-containing compounds to be used in accordance with the present invention is dependent upon the number of isocyanate groups in the prepolymer. Generally, the ratio of isocyanate groups amino groups is 1.0:0.6 to 1.0:1.1, preferably 1.0:0.8 to 1.0:0.98 on an equivalent basis.

The reaction between the NCO prepolymer and the amino group-containing compounds is generally conducted at temperatures of 5 to 90° C., preferably 20 to 80° C., and more preferably 30 to 60° C. The reaction conditions are normally maintained until the isocyanate groups are essentially completely reacted.

The final product is a stable, aqueous dispersion of polyurethane particles having a solids content of up to 60% by weight, preferably 15 to 60% by weight and more preferably 30 to 45% by weight. However, it is always possible to dilute the dispersions to any minimum solids content desired. Preferably at least 50%, more preferably at least 75% of the polyurethane particles have a particle size of less than 1.0 micron. The small particle size enhances the stability of the dispersed particles and also leads to the production of films with high surface gloss.

To prepare the aqueous, one-component, thermoset coating compositions of the present invention, the aqueous polyurethane dispersions are blended with a compound that is reactive with amide groups. These reactive groups include active methylol or methylalkoxy groups on aminoplast crosslinking agents or on other compounds such as phenol/formaldehyde adducts.

Examples compounds containing active methylol or methylalkoxy groups include melamine formaldehyde resins (including monomeric or polymeric melamine resins and partially or fully alkylated melamine resins), urea resins (e.g., methylol ureas such as urea formaldehyde resins and alkyoxy ureas such as butylated urea formaldehyde resins), N-methylol acrylamide emulsions and isobutoxy methyl acrylamide emulsions. Preferred are aminoplast resins such as melamine formaldehyde resins or urea formaldehyde resins.

To control the crosslink density of the final product, it is possible to react off one or more of the amino nitrogens or hydroxy groups. For example, alkylated melamine/formaldehyde or urea/formaldehyde resins can be reacted with a compound corresponding to formula III

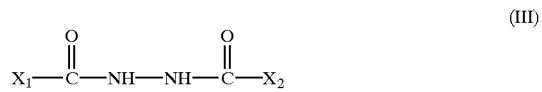

(III)

wherein $X_1$ and $X_2$ are as defined above.

In the one-component, thermoset compositions according to the invention the compounds corresponding to formula I and the coreactants should preferably be present in an amount sufficient to provide an equivalent ratio of amide groups to the groups that are reactive with amide groups of 2:1 to 1:6, more preferably 1.5:1 to 1:3 and most preferably 1.2:1 to 1:2.5. When aminoplast resins, especially melamine resins, are used, they may be present in an amount of 10 to 70%, based on weight of the reactive components. This amount is higher than the above equivalent ratios, since these resins may also undergo self-crosslinking.

When aminoplast compounds, especially monomeric melamines are used as the co-reactant for the compounds of formula I strong acid catalysts are preferred. These catalysts are well known and include p-toluenesulfonic acid, dinonyl-naphthalene disulfonic acid, dodecyl-benzenesulfonic acid, phenyl acid phosphate, monobutyl maleate, butyl phosphate and hydroxy phosphate ester. Other catalysts that may be useful include Lewis acids, zinc salts and tin salts.

The one-component, thermoset compositions of the present invention are suitable for preparing coatings, adhesives or sealants. Depending upon the particular application the compositions may also contain known additives, such as leveling agents, wetting agents, flow control agents, antiskinning agents, antifoaming agents, fillers (such as silica, aluminum silicates and high-boiling waxes), viscosity regulators, plasticizers, pigments, dyes, UV absorbers and stabilizers against thermal and oxidative degradation.

The one-component compositions may be applied to any heat resistant substrates, preferably metals, glass and ceramics, and more preferably metals. They may be applied by standard methods, such as spray coating, spread coating, flood coating, casting, dip coating, roll coating. The coating compositions may be clear or pigmented.

The one-component, thermoset compositions are cured at elevated temperatures of 80 to 250° C., preferably 100 to 230° C. and more preferably 100 to 160° C., for a period of 5 to 60 minutes, preferably 10 to 50 minutes and more preferably 20 to 40 minutes.

In the following examples all parts and percentages are by weight unless otherwise specified.

EXAMPLES

The following ingredients were used in the examples:
Preparation of Amide Diol 1—Corresponding to Formula 2

512 parts of DL-1-amino-2-propanol were stirred in a 2 liter, 3-necked round-bottomed flask under nitrogen. 777 parts of ε-caprolactone were dripped in over 90 minutes, while the temperature of the reaction mixture was maintained at approx. 30° C. with an ice water bath. The reaction mixture was stirred overnight at room temperature. The crude product was used without further purification and primarily contained the following product:

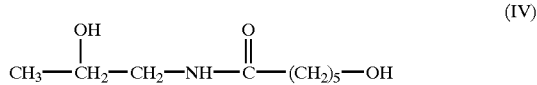

(IV)

Polyester Polyol 1

A polyester diol prepared from 1,6-hexanediol and adipic acid, number average molecular weight 840.

Polyether Monool 1

A monohydroxy polyether prepared from n-butanol, ethylene oxide, and propylene oxide (molar ratio of ethylene oxide to propylene oxide of 83:17, equivalent weight 2150).

Polyurethane Dispersion 1—High Amide Content 67.24 g (0.1600 eq.) of polyester polyol 1, 9.49 g (0.0042 eq.) of polyether monool 1, 34.78 g (0.3680 eq.) of amide diol 1, 9.56 g (0.1427 eq.) of dimethylolpropionic acid (DMPA), and 119.44 g of 1-methyl-2-pyrrolidinone (NMP) solvent were added to a 1 liter, 3-neck round flask fitted with an agitator, an additional funnel, a nitrogen inlet, and a thermocouple with a condenser. The mixture was heated to 70° C. and stirred at high shear. After DMPA was dissolved, 131.20 g (1.00 eq.) of bis-(4-isocyanatocyclohexyl)-methane (HMDI) were added to the mixture, followed by 0.02 g dibutyltin dilaurate as catalyst. The reaction was allowed to proceed at 90° C. for 5 hour, 30 min. A sample of the prepolymer was removed and analyzed for NCO content. A di-n-butyl amine titration showed that the actual NCO content was 3.46% (3.67% theoretical). The prepolymer was cooled to 70° C., triethylamine (TEA) was added to neutralize the acid and the mixture was stirred for 5 minutes. 348.00 g of the prepolymer were dispersed in 260.00 g of room temperature water under high shear. A chain extender solution was prepared by mixing 5.80 g (0.2333 eq.) of hydrazine hydrate (64% resin solids) in 31.00 g of water and was then added to the dispersion. The dispersion was post-reacted for 1 hour under high shear and then filtered before testing.

The resulting dispersion was translucent with bluish tint. The dispersion had a pH of about 7.8, a viscosity of 220 mPa.s at room temperature, and a non-volatile content of about 37%. The dispersion remained stable without sedimentation after storage for 4 months.

Polyurethane Dispersion 2 (Comparison)—High Amide Content 43.70 g (0.1040 eq.) of polyester polyol 1, 9.30 g (0.0041 eq.) of polyether monool 1, 5.00 g (0.0960 eq.) of neopentyl glycol (NPG), 9.38 g (0.1400 eq.) of dimethylolpropionic acid (DMPA), 47.16 g (0.3600 eq.) of 6-hydroxyhexyl amide, and 116.24 g of 1-methyl-2-pyrrolidinone (NMP) solvent were added to a 1 liter, 3-neck round flask fitted with an agitator, an additional funnel, a nitrogen inlet, and a thermocouple with a condenser. The mixture was heated to 70° C. and stirred at high shear. After NPG and DMPA were dissolved, 131.20 g (1.00 eq.) of bis-(4-isocyanatocyclohexyl)-methane (HMDI) were added to the mixture, followed by 0.03 g dibutyltin dilaurate as catalyst. The reaction was allowed to proceed at 90° C. for 1 hour, 10 min. A sample of the prepolymer was removed and analyzed for NCO content. A di-n-butyl amine titration showed that the actual NCO content was 3.20% (3.43% theoretical). The prepolymer was cooled to 70° C., triethylamine (TEA) was added to neutralize the acid, and the mixture was mixed for 5 minutes. 352.00 g of the prepolymer were dispersed in 250.00 g of room temperature water under high shear. A chain extender solution was prepared by mixing 5.40 g (0.2172 eq.) of hydrazine hydrate (64% resin solids) in 29.00 g of water and was then added to the dispersion. The dispersion was post-reacted for 1 hour under high shear and then filtered before testing.

The resulting dispersion had a white color and a non-volatile content of about 35%. The dispersion gelled after storage for 1 month.

This example demonstrates that it is not possible to form a stable dispersion when the amide groups are present in terminal positions on the polymer backbone.

Polyurethane Dispersion 3 (Comparison)—Low Amide Content 90.77 9 (0.2160 eq.) of polyester polyol 1, 10.40 g (0.0046 eq.) of polyether monool 1, 5.00 g (0.0960 eq.) of neopentyl glycol (NPG), 10.40 g (0.1552 eq.) of dimethylolpropionic acid (DMPA), 25.15 g (0.1920 eq.) of 6-hydroxyhexyl amide, and 130.40 g of 1-methyl-2-pyrrolidinone (NMP) solvent were added to a 1 liter, 3-neck round flask fitted with an agitator, an additional funnel, a nitrogen inlet, and a thermocouple with a condenser. The mixture was heated to 70° C. and stirred at high shear. After NPG and DMPA were dissolved, 131.20 g (1.00 eq.) of bis-(4-isocyanatocyclohexyl)-methane (HMDI) were added to the mixture, followed by 0.02 g dibutyltin dilaurate as catalyst. The reaction was allowed to proceed at 90° C. for 1 hour, 30 min. A sample of the prepolymer was removed and analyzed for NCO content. A di-n-butyl amine titration showed that the actual NCO content was 3.38% (3.50% theoretical). The prepolymer was cooled to 70° C., triethylamine (TEA) was added to neutralize the acid and the mixture was stirred for 5 minutes. 390.00 g of the prepolymer were dispersed in 300.00 g of room temperature water under high shear. A chain extender solution was prepared by mixing 6.25 g (0.2514 eq.) of hydrazine hydrate (64% resin solids) in 50.00 g of water and was then added to the dispersion. The dispersion was post-reacted for 1 hour under high shear and then filtered before testing.

The resulting dispersion had a white color, a pH of about 8.9, a viscosity of 130 mPa.s at room temperature, a particle size of about 13.5 μm and a non-volatile content of about 35%. The dispersion formed gel particles after storage for 2 weeks.

This example demonstrates that it is not possible to form a stable dispersion when the amide groups are present in terminal positions on the polymer backbone, even when the amount of amide groups is reduced.

Polyurethane Dispersion 4 (Comparison)—High Amide Content 43.70 g (0.1040 eq.) of polyester polyol 1, 9.30 g (0.0041 eq.) of polyether monool 1, 5.00 g (0.0960 eq.) of neopentyl glycol (NPG), 9.38 g (0.1400 eq.) of dimethylolpropionic acid (DMPA), and 116.24 g of 1-methyl-2-pyrrolidinone (NMP) solvent were added to a 1 liter, 3-neck round flask fitted with an agitator, an additional funnel, a nitrogen inlet, and a thermocouple with a condenser. The mixture was heated to 70° C. and stirred at high shear. After NPG and DMPA were dissolved, 131.20 g (1.00 eq.) of bis-(4-isocyanatocyclohexyl)-methane (HMDI) were added to the mixture, followed by 0.03 g of dibutyltin dilaurate as catalyst. The reaction was allowed to proceed at 90° C. for 2 hours, 45 min. A sample of the prepolymer was removed and analyzed for NCO content. A di-n-butyl amine titration showed that the actual NCO content was 8.69% (8.75% theoretical). 47.16 g (0.3600 eq.) of 6-hydroxyhexyl amide were added to the prepolymer. The mixture was allowed to react for another hour and a sample was tested for the NCO content. The actual NCO content was 3.32% (3.43 theoretical). The prepolymer was cooled to 70° C., triethylamine (TEA) was added to neutralize the acid and the mixture was stirred for 5 minutes. 339.00 g of the prepolymer were dispersed in 250.00 g of room temperature water under high shear. A chain extender solution was prepared by mixing 5.40 g (0.2172 eq.) of hydrazine hydrate (64% resin solids) in 30.00 g of water and was then added to the dispersion. The dispersion was post-reacted for 1 hour under high shear and then filtered before testing.

The resulting dispersion had a white color and a non-volatile content of about 35%. The dispersion gelled after storage for 1 month.

This example demonstrates that it is not possible to form a stable dispersion when the amide groups are present in terminal positions on the polymer backbone, even when the amide groups are introduced in a later step in the process.

APPLICATION EXAMPLE 60 parts of polyurethane dispersion 1 were mixed with 5.6 parts of a melamine resin (Resimene AQ 7550, a partially methoxylated melamine with a high imino content, a 60% monomer content and a 1.8 degree of polymerization, available from Solutia at 79% solids in water), 2.4 parts of a 10% aqueous solution of a flow aid (FC 430, a nonionic fluoroaliphatic polymeric ester available from 3M) and 0.3 parts of a catalyst (Nacure 4575, a phenylacid phosphate catalyst available from King Industries).

Coatings were spray applied to cold rolled steel panels (Bonderite 952) coated with PPG black base coat (DAU 9300). The films were flashed for 10 min. at ambient temperature and baked 30 minutes at 132° C.

The resulting films had good gloss and DOI, good MEK and gasoline resistance, and excellent hardness.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyurethane dispersion containing secondary amide groups in the backbone of the polyurethanes, wherein the secondary amide groups (calculated as NH—CO—, MW 43) are present in an amount of 1 to 14% by weight, based on the weight of the polyurethanes, and are incorporated by reacting isocyanate groups with a monoamide corresponding to the formula

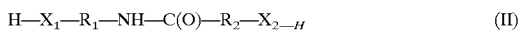

$$H-X_1-R_1-NH-C(O)-R_2-X_2-H \quad (II)$$

wherein $X_1$ and $X_2$ are the same or different and represent the groups obtained by removing a hydrogen atom from a hydroxy group or a primary or secondary amino group and $R_1$ and $R_2$ are the same or different and represent linear or branched aliphatic hydrocarbon groups that are optionally substituted by groups that do not contain isocyanate-reactive hydrogen atoms.

2. The dispersion of claim 1 wherein said polyurethanes contain 10 to 120 milliequivalents, per 100 grams of polyurethanes, of chemically incorporated anionic groups and up to about 10% by weight, based on the weight of said polyurethanes, of lateral and/or terminal hydrophilic chains containing ethylene oxide units.

3. The dispersion of claim 2 wherein at least about 80% of said anionic groups are carboxylate groups neutralized with tertiary amines.

4. The dispersion of claim 1 wherein $X_1$ and $X_2$ represent the groups obtained by removing a hydrogen atom from a hydroxy group and $R_1$ and $R_2$ are the same or different and represent linear or branched aliphatic hydrocarbon groups having 1 to 10 carbon atoms.

5. The dispersion of claim 2 wherein $X_1$ and $X_2$ represent the groups obtained by removing a hydrogen atom from a hydroxy group and $R_1$ and $R_2$ are the same or different and represent linear or branched aliphatic hydrocarbon groups having 1 to 10 carbon atoms.

6. The dispersion of claim 3 wherein $X_1$ and $X_2$ represent the groups obtained by removing a hydrogen atom from a hydroxy group and $R_1$ and $R_2$ are the same or different and represent linear or branched aliphatic hydrocarbon groups having 1 to 10 carbon atoms.

7. The dispersion of claim 1 wherein the secondary amide groups of formula I are obtained by removing the hydrogen atoms from the hydroxy groups present in the reaction product of a hydroxyalkyl amine and ε-caprolactone.

8. The dispersion of claim 2 wherein the secondary amide groups of formula I are obtained by removing the hydrogen atoms from the hydroxy groups present in the reaction product of a hydroxyalkyl amine and ε-caprolactone.

9. The dispersion of claim 3 wherein the secondary amide groups of formula I are obtained by removing the hydrogen atoms from the hydroxy groups present in the reaction product of a hydroxyalkyl amine and ε-caprolactone.

10. A one-component, thermoset composition containing the aqueous polyurethane dispersion of claim 1 and a melamine formaldehyde resin, a urea resin, an N-methylol acrylamide emulsion or an isobutoxy methyl acrylamide emulsion.

11. A one-component, thermoset composition containing the aqueous polyurethane dispersion of claim 1, an acid catalyst and a melamine formaldehyde resin or a urea resin.

12. A heat resistant substrate coated with the thermoset composition of claim 10.

13. A heat resistant substrate coated with the thermoset composition of claim 11.

14. The dispersion of claim 1 wherein $X_1$ and $X_2$ represent the groups obtained by removing a hydrogen atom from a hydroxy group and $R_1$ and $R_2$ are the same or different and represent linear or branched aliphatic hydrocarbon groups having 1 to 6 carbon atoms.

15. The dispersion of claim 2 wherein $X_1$ and $X_2$ represent the groups obtained by removing a hydrogen atom from a hydroxy group and $R_1$ and $R_2$ are the same or different and represent linear or branched aliphatic hydrocarbon groups having 1 to 6 carbon atoms.

16. The dispersion of claim 3 wherein $X_1$ and $X_2$ represent the groups obtained by removing a hydrogen atom from a hydroxy group and $R_1$ and $R_2$ are the same or different and represent linear or branched aliphatic hydrocarbon groups having 1 to 6 carbon atoms.

* * * * *